(No Model.)
U. BACHMANN.
APPARATUS FOR IMPREGNATING LIQUIDS WITH GAS.
No. 452,512. Patented May 19, 1891.
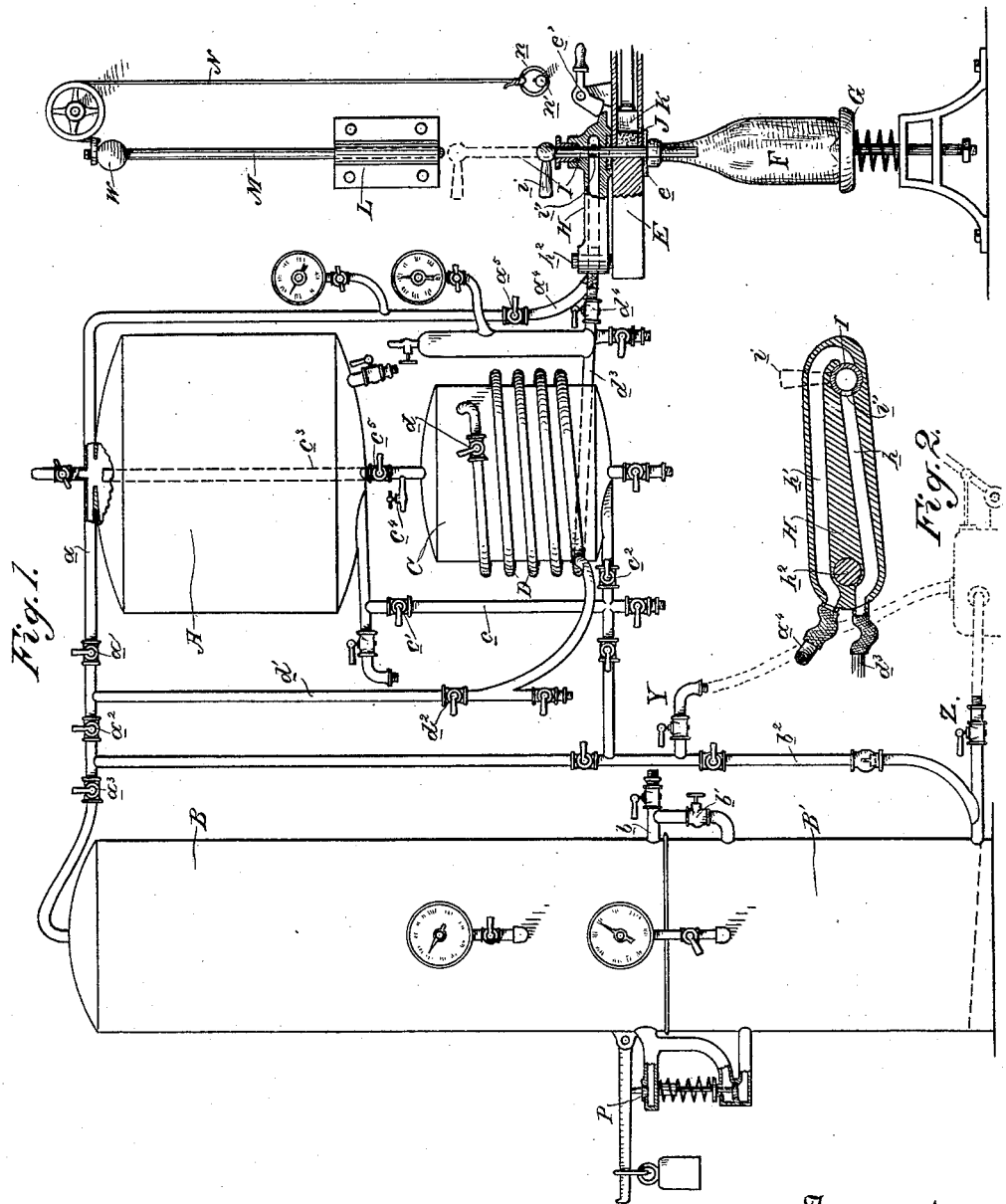
Witnesses:
J. H. Kruse
H. C. Lee.
Inventor,
Ulrich Bachmann
By Dewey & Co.
atty

UNITED STATES PATENT OFFICE.

ULRICH BACHMANN, OF SAN FRANCISCO, CALIFORNIA.

APPARATUS FOR IMPREGNATING LIQUIDS WITH GAS.

SPECIFICATION forming part of Letters Patent No. 452,512, dated May 19, 1891.

Application filed June 26, 1890. Serial No. 356,878. (No model.)

*To all whom it may concern:*

Be it known that I, ULRICH BACHMANN, a citizen of the United States, residing in the city and county of San Francisco, State of California, have invented an Improvement in Apparatus for Impregnating Liquids with Gas While Bottling the Same; and I hereby declare the following to be a full, clear, and exact description of the same.

My invention relates to the general class of apparatus for impregnating liquids with gases; and it consists in the hereinafter described and claimed apparatus, the object of which is to return the gas formed by a fermenting-liquid into the same liquid by impregnating it when drawing it off into bottles.

Referring to the accompanying drawings for a more complete explanation of my invention, Figure 1 is an elevation of my apparatus. Fig. 2 is a horizontal section of filling-spout H.

A is a vessel to be filled with the liquid to be fermented and afterward bottled. The gas from this fermenting-liquid passes from the top of this vessel through a pipe $a$ into a gas-vessel B, three cocks $a'$, $a^2$, and $a^3$ being let into and controlling pipe $a$. As each gallon of the liquid forms two and one-third gallons of gas for each per cent. of sugar contained in the liquid, the vessel B will soon be filled to such a pressure as to arrest fermentation in vessel A; but before this point is reached the gas is forced by a pump and suitable connections from the vessel B into the vessel B', so that the pressure of gas in B is kept down below the point at which it would arrest fermentation in vessel A, while the surplus gas is stored up in vessel B'. This passage of gas from B to B' is effected by closing for a moment the cock $a^2$, whereby the gas from B passes through pipe $b^2$, through the connections Y and Z, with which the pump may be supposed to be connected, and thus into the storage-vessel B'. By thus providing for the storage of the gas in vessel B' the liquid is allowed to ferment to the proper point, which it might not do were the gas to be admitted only to vessel B. As soon as this point is reached a pipe $b$, connecting the two vessels, is opened by its cock $b'$, and enough gas from B' is allowed to pass into B to raise the pressure therein sufficiently to arrest fermentation in the liquid.

C is a vessel below vessel A, and they are connected by a pipe $c$, issuing from the base of one and entering the bottom of the other. Cocks $c'$ and $c^2$ control this connecting-pipe.

Wound about vessel C is a pipe-coil D, the upper end of which opens into the upper portion of said vessel, and said end is controlled by a cock $d$.

A pipe $b^2$ leads from the base of vessel B' and connects with pipe $a$ above. From pipe $a$ leads a pipe $d'$, controlled by a cock $d^2$, and the lower end of this pipe connects with the lower portion of coil D. Now upon opening cocks $c'$ and $c^2$ the liquid from vessel A passes down through pipe $c$ into vessel C, driving out the air in said vessel through a top pipe $c^3$ and escape-cock $c^4$. Said pipe $c^3$ extends upwardly into and opens out near the top of vessel A and is controlled by a cock $c^5$. The space in vessel A left vacant by the liquid as it passes out is filled with gas from vessel B' through pipe $b^2$. When the cock $a'$ is closed the connection between vessels B and A is broken, and by opening cocks $d^2$ and $d$ the gas from vessel B passes into and through coil D into vessel C, and in this course it passes into and through the liquid in said coil, which flows into it from vessel C through cock $d$, and in passing down to the bottle is impregnated with gas. Cock $c^5$ being opened, the gas from C passes up through pipe $c^3$ into vessel A and fills the space vacated by the passing-out liquid, and thus the vessels A, B, and C have the same pressure.

Suitably-arranged manometers indicate the density of the gas in the several vessels and the amount of gas the liquid has already absorbed.

P is a valve-controlled safety communication between vessels B and B' and between vessel B and the outer air.

E is a table, having under it an elastic washer $e$, against which the mouth of the bottle F is pressed air-tight by means of a spring-actuated support G, upon which the bottle rests.

H is the filling-spout, having within it two separate passages $h$ and $h'$, which open out at their forward ends at different points. At the rear end the passage $h$ communicates with the projecting discharge end $d^3$ of coil D, and this communication is controlled by a cock $d^4$.

The rear end of passage $h'$ is connected with a pipe $a^4$, which issues from the top of vessel A, and its lower end is controlled by a cock $a^5$. The filling-spout H is hinged or jointed at its rear end at $h^2$, so that said spout may be turned through an arc in a horizontal plane. The forward end of the filling-spout rests on top of the table E and is clamped down firmly thereon by means of a cam-lever $e'$. A suitable washer may intervene between the bottom of the spout and the table to make a tight joint. Passing down through the forward end of the filling-spout, in a suitable stuffing-box, is a hollow filling-rod I, the lower end of said rod passing through table E and entering the bottle F, its lower end being open. The rod has a handle $i$ on top, and it is adapted to be raised up and down, and also to be turned axially. It is provided with an opening $i'$, which, when the rod is pressed down, will come to the level of the exits of passages $h$ and $h'$ of the filling-spout, and which, when the rod is turned, will come into line and join either of said exits.

In the side of table E is made an opening, in which is placed a cork J, and said cork is pushed upon by a rammer K to be operated by suitable mechanism.

L is a fixed guide, through which passes a vertically-movable plunger-rod M, having a weight W. This rod is hung up by a cord N, having a ring $n$ on its lower end, which is adapted to fit over a pin $n'$.

The operation of the apparatus is as follows: As heretofore described, the liquid is impregnated with gas to a certain extent before it reaches the exit end $d^3$ of coil D, and is then ready to pass to the bottle and receive its full complement of gas. Before the bottle F is placed upon support G the air is expelled from it, and it is supplied with as much gas as will remain in it without pressure. Then the bottle is placed upon support G, and by it is raised, so that its mouth fits tightly up against the washer $e$ under table E. Then the spout H is swung around over and is clamped down upon the table. The filling-rod I is now pushed down through the spout end, so that its lower open end passing through the table enters the bottle to the level to which said bottle is to be filled. Said rod is then turned so that its opening $i'$ comes into communication with the gas-passage $h'$ of the filling-spout. The cock $a^5$ being now opened, the gas from vessel A passes through pipe $a^4$ into passage $h'$, and thence through rod I into the bottle, whereby said bottle is supplied with gas under the same pressure as the gas in vessels A, B, and C. Then cock $a^5$ is closed, and the rod I is turned to bring its opening into communication with the liquid-passage $h$ of the filling-spout. Cock $d^4$ is now opened, and the liquid passes from the end $d^3$ of coil D into and through said passage, and through rod I into the bottle and fills it, the gas not absorbed passing backwardly through the liquid. Now the rod I is lifted, and as its lower end clears the opening in table E the cork J is forced in by rammer K to occupy the aperture left vacant by the rising rod, and said cork is held in place by the rammer. When rod I clears the table, the spout H is swung around out of the way. The cord N is now released, and the weighted plunger-rod descending drives the cork home into the bottle. It will thus be seen that the liquid is not fully impregnated with gas until bottled, as during its course to the bottle it is being continually supplied with gas.

Having thus described my invention, what I claim as new, and desire to secure by Letters Patent, is—

1. In an apparatus for impregnating liquids with gases while bottling the same, the upper liquid-vessel A, in which the gas is generated from the liquid, the vessel B for receiving said gas, the lower liquid-vessel C for receiving the liquid on its course to the bottles, a cock-controlled pipe connecting vessels A and B, by which the gas passes from A to B, a cock-controlled pipe connecting vessels B and C, by which the gas from B passes to C, a cock-controlled pipe connecting vessels C and A, by which the gas passes from C to A, and a cock-controlled pipe connecting vessels A and C, by which the liquid passes from A to C, substantially as herein described.

2. In an apparatus for impregnating liquids with gases while bottling the same, the upper liquid-vessel, in which the gas is generated from the liquid, the vessel B for receiving said gas, the lower liquid-vessel C for receiving the liquid on its course to the bottle, the cock-controlled coil-pipe D about vessel C, opening into said vessel near its upper portion and leading to the bottling apparatus at its other end, the cock-controlled pipe $a$, by which the gas passes from vessel A to vessel B, the cock-controlled pipe $d'$, by which the gas passes from vessel B to the coil D and thence into vessel C, the cock-controlled pipe $c^3$, by which the gas passes from vessel C into vessel A, and the cock-controlled pipe $c$, by which the liquid passes from vessel A to vessel C, substantially as herein described.

3. In an apparatus for impregnating liquids with gases while bottling the same, the upper liquid-vessel A, in which the gas is generated from the liquid, the vessel B for receiving said gas, the lower liquid-vessel C for receiving the liquid from vessel A, the lower gas-reservoir B′, and cock-controlled pipes connecting the several vessels for passing the gas from A to B, from B to C, from C to A, from A to B′, from B′ to B, from B′ to A, and from B′ to C, and for passing the liquid from A to C, substantially as herein described.

4. In an apparatus for impregnating liquids with gases while bottling the same, the upper liquid-vessel A, in which the gas is generated from the liquid, the vessel B for receiving said gas, the lower liquid-vessel C for receiving the liquid from vessel A, the cock-controlled coil-pipe about vessel C, communicating with said vessel at its upper portion and extending to the bottling apparatus, the lower gas-reservoir B' and cock-controlled pipes connecting the several vessels for passing the gas from A to B, from B to coil-pipe D, and thence to C, from C to A, from A to B', from B' to B, from B' to A, and from B' to C, and for passing the liquid from A to C, substantially as herein described.

5. In an apparatus for impregnating liquids with gases while bottling the same, the vessels A, B, and C, and the coil-pipe D and cock-controlled pipes connecting said vessels, and coil-pipe for passing the gas to them and passing the liquid from A to C, as described, a filling-spout for supplying the bottles with gas and liquid, a cock-controlled connection between said spout and the coil-pipe D, and a cock-controlled pipe $a^4$, connecting said spout with the vessel A, substantially as herein described.

6. In an apparatus for impregnating liquids with gases while bottling the same, the swinging filling-spout H, having separate passages communicating with liquid and gas pipes, and the movable hollow filling-rod passing through the spout into the bottle and having an opening adapted to communicate successively with the passages of said spout, substantially as herein described.

7. In an apparatus for impregnating liquids with gases while bottling the same, the swinging filling-spout connected with the liquid and gas pipes and the vertically-movable and hollow filling-rod in said spout and having an opening communicating therewith, in combination with the table E, against which the bottle is held, the opening in said table for receiving a cork, the rammer for moving the cork to position over the bottle, and the plunger-rod for driving the cork home, substantially as herein described.

8. An apparatus for impregnating liquids with gases while bottling the same, consisting of the vessels A, B, B', and C, the cock-controlled coil-pipe D, the cock-controlled pipes for passing the gas to said vessels and coil-pipe and for passing the liquid from vessel A to vessel C, the swinging double-passaged filling-spout H, connected with the coil-pipe and with the vessel A, whereby it receives gas and liquid, the vertically-movable hollow rod in said spout, having an opening communicating therewith, the table E, against which the bottle is held, and having an opening to receive a cork, the rammer for moving the cork to position, and the plunger-rod for driving it home, substantially as herein described.

In witness whereof I have hereunto set my hand.

ULRICH BACHMANN.

Witnesses:
ARNOLD RUEPP,
WM. F. BOOTH.